United States Patent [19]

Sands

[11] 4,420,442
[45] Dec. 13, 1983

[54] MANUFACTURING PROCESS FOR HOLLOW MICROSPHERES

[75] Inventor: Bruce W. Sands, Malvern, Pa.

[73] Assignee: PQ Corporation, Valley Forge, Pa.

[21] Appl. No.: 421,002

[22] Filed: Sep. 21, 1982

Related U.S. Application Data

[62] Division of Ser. No. 253,139, Apr. 13, 1981, abandoned.

[51] Int. Cl.$^3$ .............................................. B29C 6/00
[52] U.S. Cl. ....................................... 264/13; 106/75; 264/14; 264/15; 428/402; 428/325; 521/56; 521/60
[58] Field of Search .................. 428/402, 325; 264/13, 264/15; 521/56, 60; 106/75

[56] References Cited

U.S. PATENT DOCUMENTS

| | | | |
|---|---|---|---|
| 3,794,503 | 2/1974 | Netting | 428/403 |
| 3,796,777 | 3/1974 | Netting | 264/13 |
| 3,888,957 | 6/1975 | Netting | 264/13 |
| 3,896,196 | 7/1975 | Dickey | 264/13 |
| 4,049,593 | 9/1977 | Sato | 521/56 |
| 4,127,622 | 11/1978 | Watanabe et al. | 264/13 |
| 4,361,624 | 11/1982 | Spivack | 264/13 |

*Primary Examiner*—George F. Lesmes
*Assistant Examiner*—E. Rollins Buffalow
*Attorney, Agent, or Firm*—Ernest G. Posner; Fred C. Philpitt; J. Stephen Bobb

[57] ABSTRACT

More perfect, less porous hollow microspheres can be prepared by spray-drying dispersions of film-forming solids that contain certain organic solvents. The organic solvents are water-miscible and have boiling points of 100° C. or more. The solvent is added just prior to spray drying and the resulting product has fewer cracks and/or holes. This improvement is especially beneficial to preparation systems involving alkali metal silicates and "polysalts."

6 Claims, No Drawings

MANUFACTURING PROCESS FOR HOLLOW MICROSPHERES

This application is a division of application Ser. No. 253,139, filed Apr. 13, 1981, now abandoned.

BACKGROUND OF THE INVENTION

My invention relates to the preparation of hollow microspheres. In particular, my invention involves an improvement in the manufacture of hollow microspheres by spray drying from aqueous media, said improvement comprising the addition of a water-miscible organic solvent with a high boiling point to the solution to be spray dried. The resulting product has fewer imperfections such as holes and/or cracks.

Hollow microspheres can be prepared by spray drying, solutions that contain nearly any film-forming substance. Spray drying is particularly suited to the preparation of hollow microspheres from solids dispersed in aqueous media. U.S. Pat. Nos. 3,796,777; 3,794,503 and 3,888,957 disclose hollow spheres prepared by spray drying alkali metal silicate solutions that have been combined with "polysalt" solutions, and then carefully drying the intermediate hollow spheres. The process by which these products are made must be tightly controlled to minimize the holes, cracks and other surface imperfections that contribute to porosity that is undesirable in these products.

It is an object of this invention to prepare hollow spheres with less porosity while allowing more latitude in processing conditions.

SUMMARY OF THE INVENTION

I have found that the addition of certain organic solvents to aqueous dispersions of film-forming materials yields more perfect hollow microspheres. This improvement is especially beneficial to preparation systems consisting of alkali metal silicates and "polysalt." The organic solvents are alkali stable, water miscible and have boiling points of 100° C. or more. The solvents remain in the shell of the sphere as the drying progresses so that it remains more flexible and penetrable to moisture. The resulting spheres are more perfect in surface conformation and much less porous than hollow microspheres manufactured without the benefit of my improvement.

THE INVENTION

Almost any film-forming substance which can be dispersed in water can be used to form largely hollow particles by spray drying. Examples of synthetic film-forming systems useful in this process are polyvinyl alcohol, phenol-formaldehyde resin, urea-formaldehyde resin, melamine-formaldehyde resin, alkyd resin, cellulose esters, polyvinyl chloride, polyvinyl-chloride-polyvinyl-alcohol copolymers, and polyvinyl butyral. Natural film-forming systems are also useful, such as soybean protein, zein protein, alginates, cellulose xanthate, and cuprammonium cellulose. Inorganic film-formers are also useful, such as sodium silicate, polyborates and polyphosphates.

In general, largely spherical particles are produced from such substances by forming a solution of the film-forming substance in a volatile solvent and spray drying that solution under conditions that lead to the production of hollow particles of the size required. A substance that breaks down to provide a gas in the interior of the particle may be required with certain systems to maintain the expansion of the product while it is still plastic and to prevent breakage under atmospheric pressure when the walls have set. Examples of useful blowing agents include inorganic and organic salts of carbonates, nitrites, carbamates, oxalates, formates, benzoates, sulfites and bicarbonates such as sodium bicarbonate, ammonium carbonate, magnesium oxalate, etc. Other organic substances are also useful, such as p-hydroxy phenylazide, di-N-nitropiperazines, polymethylene nitrosamines and many others. Selection of a particular blowing agent would be based upon compatibility with the film-forming system and the intended use of the product.

Film-forming systems that are of particular value in carrying out the process of this invention and which do not require the addition of a gas-forming substance as a blowing agent are disclosed in U.S. Pat. No. 3,796,777, hereby incorporated by reference. Hollow spheres are produced by forming a homogeneous aqueous solution comprising a sodium silicate and a polysalt selected from a group consisting of ammonium pentaborate, sodium pentaborate and sodium hexametaphosphate and then spray drying the solution under conditions necessary to produce hollow spheres of the size required. The spheres are further dried to reduce the water content and to set the walls. Such spheres have a bulk density of about 0.6 to 20 lbs/ft$^3$, a true particle density of about 2 to 40 lbs/ft$^3$ and a particle size of about 1 to 500 microns.

The film-forming system in which the organic solvent is used will determine the characteristics required, but in general it must be water miscible and have a boiling point of 100° C. or more. Those solvents used with alkaline systems, such as those containing alkali metal silicate, must be alkali stable and should not adversely affect the stability of the silicate solution. These characteristics need only be fleeting, less than about 3 minutes, as the organic solvent need only be added immediately before spray drying. In general, those organic solvents that have a number of hydroxyl groups or exposed oxygens are useful in the preferred alkali metal silicate polysalt combination. Examples of useful solvents include, among others, cellosolve, cellosolve acetate, ethyl cellosolve, diglyme and tetraglyme. About 0.5 to 5.0 parts by weight of the solvent for each 100 pbw of the solids in the feed solution are required to provide the beneficial effects of the improved process.

The solution used to form hollow microspheres usually should contain 5 to 50% of the film-forming solids. The amount of organic solvent additive to achieve improved results is between 0.5 and 5%, so that between 0.025 and 2.5% of the solution spray dried to form the hollow microspheres is solvent. The film-forming system that I have found to particularly benefit from the improvement of my process comprises a homogeneous solution of sodium silicate and a "polysalt" wherein the ratio of "polysalt" solids to silicate solids should be between 0.02/1.0 and 3.0/1.0. U.S. Pat. No. 3,794,503, which is hereby incorporated by reference, describes "polysalts" as salts with anion to cation ratios that are reduced when the salts dissolve and become hydrolyzed. Ammonium pentaborate (APB), sodium pentaborate (SPB) and sodium hexametaphosphate (SHP) are preferred "polysalts." If a solution of APB and sodium silicate is used, the total solids would be 5 to 35% with 3 to 15% as APB; the ratio of APB solids to sodium silicate solids should be between 0.03:1.0 and 0.5:1.0 and preferably between 0.06:1.0 and 0.5:1.0. About 0.015 to 1.75% of the organic solvents would be added to such solutions. A system having 0.02 to 0.3 parts by weight (pbw) of SPB per pbw of sodium silicate solids contains 17.4 to 34.5% total solids and 6 to 7% SPB solids. This combination would require 0.087 to 1.7% of the appropriate organic solvent. A system having 1 to 3 pbw of SHP per 1 pbw of silicate solids contains 29.6 to 48% of total solids. This combination requires 0.14 to 2.4% of the organic solvent.

The process is initiated by preparing a solution of the film-forming solids in water, observing any required restrictions as to concentration, order of addition, temperature or the like. It is important that any restrictions relating to viscosity are observed; if the viscosity of the solution is too high when spray dried, fibers may result. After the homogeneous solution is prepared, the organic solvent is added with rapid agitation to ensure proper dispersion. The resulting material is spray dried prior to any manifestation of instability such as rising viscosity or gelling. I prefer to spray dry within 10 minutes.

Any conventional spray drying equipment can be used to implement the process of this invention. The suspension-solution can be atomized into the spray tower by either an atomizer wheel or a spray nozzle. Since a wide range of film-forming materials and solvents can be used in this process a wide range of spray drying temperatures can be used. We have found that inlet temperatures of 50° to 500° C. can be used with outlet temperatures of about 40° to 300° C. In particular, I have found that satisfactory product can be prepared from the preferred film-forming system of sodium silicate and polysalt by spray drying the material at an inlet temperature of 200° to 500° C. and an outlet temperature of 100° to 300° C.

The product recovered from the spray dryer may be ready for packaging and/or use, or it may require an additional drying step. The systems that use water as the solvent, and especially the system utilizing sodium silicate and a polysalt, may require this additional drying step. The spray dried products from such water solvated systems usually contain more than 10% water. This water content is reduced to about 7% or less by slowly heating the particles to temperatures between 70° and 400° C.

The products of these process steps are hollow particles that are for the most part spherical with some agglomerated spheres. Some of the products are multicellular or multispherical. Multispherical particles are composed of spheres within spheres. The spherical products have particle diameters of about 1 to 500 micrometers. The products have fewer surface imperfections than microspheres made without my improvement and are therefore less porous. This difference in porosity is best demonstrated by comparing the effective density with the true particle density. For products that are porous the true particle density will be significantly higher than the effective density, while for products made by the improved process of my invention the true particle density is not that much increased over the effective density. The effective density is the value derived from the volume of a liquid resin displaced when the microspheres are first introduced into it. The true particle density is the value derived from displacement of air. Perfect spheres that are not porous will have an effective density that is equal to the true particle density. Microspheres made with just a sodium silicate and a "polysalt" may have as much as 50% difference between the bulk density and the true particle density, while microspheres made according to the teachings of my invention have only a difference of 5%. These results are even more impressive since they can be achieved with less tightly controlled reaction conditions such as spray dryer feed rate, spray dryer temperature and the rate of final drying.

The product of my improved process can be used for any purpose that prior art spheres presently fulfill.

EXAMPLES

The following examples illustrate certain embodiments of my invention. The purpose of these examples does not include establishing the scope of the invention which is defined in the disclosure and recited in the claims.

EXAMPLE 1

This example illustrates the prior art method of preparing hollow microspheres using the film-forming system of sodium silicate and a polysalt. Sodium silicate (500 pbw of 2.0 $SiO_2/Na_2O$, 44% solids) was thoroughly mixed with 500 pbw of a 10% APB solution heated to above about 60° C. Mixing was continued until any lumps were dispersed. The resulting homogeneous solution was fed to a spray dryer with an inlet temperature of about 410° C. and an outlet temperature of about 150° C. The atomizer pressure was 6 kg/cm$^2$. The product recovered was subjected to a further drying step in an oven. The initial temperature was below 100° C. and gradually the temperature was raised to about 300° C. in the period of an hour. Drying continued until the product contained less than 4% water. The product had a water content of 3.3%. Its effective density was 12 lb/ft$^3$ and the true particle density was 15 lb/ft$^3$.

EXAMPLE 2

This example illustrates the improvement of my invention. The method described in Example 1 was carried out except that 1 pbw of diglyme for each 100 pbw of solids was added to the silicate-APB solution before spray drying. The product recovered has 3.5% water and an effective density of 10 lb/ft$^3$ and a true particle density of 11 lb/ft$^3$.

I claim:

1. In the process of preparing hollow microspheres by spray drying an aqueous dispersion of film-forming substance and recovering the product the improvement consisting of adding a porosity reducing amount of a water miscible organic solvent selected from the group consisting of cellosolve, cellosolve acetate, ethyl cellosolve, diglyme and tetraglyme with a boiling point of at least 100° C. prior to spray drying.

2. The process of claim 1 wherein about 0.5 to 5.0 parts by weight of the organic solvent for each 100 parts by weight of the film-forming solids is added.

3. In the process of preparing hollow microspheres by spray drying a solution of alkali metal silicate and a "polysalt" recovering the spray dryer product and further drying, the improvement consisting of adding a porosity-reducing amount of a water-miscible, alkali-stable organic solvent selected from the group consisting of cellosolve, cellosolve acetate, ethyl cellosolve, diglyme and tetraglyme with a boiling point of at least 100° C. prior to spray drying.

4. The process of claim 3 wherein 0.5 to 5.0 pbw of the organic solvent is added for each 100 pbw of silicate and "polysalt" solids.

5. In the process of preparing hollow microspheres by spray drying a solution selected from the group consisting of sodium silicate and ammonium pentaborate, sodium pentaborate and sodium hexametaphosphate, recovering the spray dryer product and further drying, the improvement consisting of adding a porosity-reducing amount of a water-imiscible, alkali-stable, silicate-compatible organic solvent selected from the group consisting of cellosolve, cellosolve acetate, ethyl cellosolve, diglyme and tetraglyme with a boiling point of at least 100° C. prior to spray drying.

6. The process of claim 5 wherein 0.5 to 5.0 pbw of the organic solvent is added for each 100 pbw of sodium silicate and ammonium pentaborate, sodium pentaborate or sodium hexametaphosphate solids.

* * * * *